United States Patent [19]

Lazar

[11] Patent Number: 5,080,386
[45] Date of Patent: Jan. 14, 1992

[54] SELF-ALIGNING AND SELF-CONNECTING TRAILER HITCH

[76] Inventor: Joseph Lazar, 306 Maple, Ziegler, Ill. 62999

[21] Appl. No.: 608,288

[22] Filed: Nov. 2, 1990

[51] Int. Cl.$^5$ .................................. B60D 1/06
[52] U.S. Cl. ......................... 280/477; 280/511
[58] Field of Search .................. 280/477, 504, 511

[56] References Cited

U.S. PATENT DOCUMENTS

| | | | |
|---|---|---|---|
| 4,417,748 | 11/1983 | Dortch | 280/477 |
| 4,657,275 | 4/1987 | Carroll | 280/477 |
| 4,903,978 | 2/1990 | Schrum, III | 280/477 |

*Primary Examiner*—Mitchell J. Hill
*Attorney, Agent, or Firm*—Fleit, Jacobson, Cohn, Price, Holman & Stern

[57] ABSTRACT

A ball and socket hitch between a towing vehicle and a towed trailer which is self-aligning and self-connecting. The hitch ball is provided with an underlying base supporting an upstanding housing having rearwardly diverging walls which guide the tongue on the towed vehicle to align the ball socket on the tongue with the hitch ball. A slide plate is operatively associated with the base and oriented in a vertically inclined position and has a bifurcated forward end engaging the hitch ball. The slide plate combined with the housing walls guides and lifts the tongue of the towed vehicle upwardly into overlying, aligned relation to the hitch ball. The slide plate pivots to a generally horizontal position as the ball socket on the tongue moves into overlying aligned relation to the hitch ball and then drops downwardly towards the base plate to enable the ball socket to drop downwardly onto and thus be connected with the hitch ball. The slide plate, housing walls, base and hitch ball have a unique relationship by which the slide plate will guide and lift the tongue and ball socket upwardly as the towing vehicle moves rearwardly toward the tongue of the towed vehicle to elevate the ball socket above the hitch ball with the housing walls aligning the tongue and ball socket with the hitch ball with the slide plate then automatically dropping downwardly to enable gravity to move the ball socket downwardly onto the hitch ball.

10 Claims, 2 Drawing Sheets

SELF-ALIGNING AND SELF-CONNECTING TRAILER HITCH

BACKGROUND OF THE INVENTION

1. Field of the Invention

A ball and socket hitch between a towing vehicle and a towed trailer which is self-aligning and self-connecting. The hitch ball is provided with an underlying base supporting an upstanding housing having rearwardly diverging walls which guide the tongue on the towed vehicle to align the ball socket on the tongue with the hitch ball. A slide plate is operatively associated with the base and oriented in a vertically inclined position and has a bifurcated forward end engaging the hitch ball. The slide plate combined with the housing walls guides and lifts the tongue of the towed vehicle upwardly into overlying, aligned relation to the hitch ball. The slide plate pivots to a generally horizontal position as the ball socket on the tongue moves into overlying aligned relation to the hitch ball and then drops downwardly towards the base plate to enable the ball socket to drop downwardly onto and thus be connected with the hitch ball. The slide plate, housing walls, base and hitch ball have a unique relationship by which the slide plate will guide and lift the tongue and ball socket upwardly as the towing vehicle moves rearwardly toward the tongue of the towed vehicle to elevate the ball socket above the hitch ball with the housing walls aligning the tongue and ball socket with the hitch ball with the slide plate then automatically dropping downwardly to enable gravity to move the ball socket downwardly onto the hitch ball.

DESCRIPTION OF THE PRIOR ART

Various efforts have been made to align the components of an articulate connection between a towing vehicle and a towed trailer and some efforts have been made to not only align the hitch components but to elevate the hitch component on the towed trailer to facilitate its engagement with the hitch component on the towed vehicle. The following U.S. Pat. Nos. are relevant to this invention.

4,657,275
4,903,978
3,773,356
1,626,993
3,747,958
4,417,748
4,840,392
4,226,438
4,871,184

U.S. Pat. Nos. 4,657,275 and 4,903,978 provide an aligning structure for a trailer hitch which includes a ramp to elevate the ball socket in relation to the hitch ball. However, such devices include a ramp or inclined plate which is automatically released to pivot downwardly in relation to the ball hitch in response to the tongue on the towed vehicle engaging and releasing a support leg or release arm to pivot or move it to a released position to enable the ramp or inclined plate to pivot downwardly about a transverse hinge axis thus enabling the trailer tongue and the ball socket thereon to engage the hitch ball on the towed vehicle. However, the above prior patents do not disclose a structure equivalent to this invention in which the slide plate has a forward edge portion engaging and supported by the hitch ball itself thereby eliminating the use of any support leg or release arms.

SUMMARY OF THE INVENTION

An object of the present invention is to provide a self-aligning and self-connecting ball and socket hitch assembly between a towing vehicle and a towed trailer incorporating a guide structure for aligning a ball socket with a hitch ball and a slide plate which elevates the ball socket to a position above the hitch ball when the ball socket and hitch ball are moved into alignment with the slide plate being pivoted to a generally horizontal position by engagement of the trailer tongue therewith as the ball socket aligns with the hitch ball with the slide plate then dropping downwardly to a position below the hitch ball to enable the ball socket to drop onto and thus be connected to the hitch ball.

Another object of the invention is to provide a hitch in accordance with the preceding object in which the hitch ball is associated with a base plate and an upstanding housing thereon having sidewalls which extend upwardly and diverge rearwardly on opposite sides of the hitch ball to guide the trailer tongue in a manner to align the hitch ball socket on the trailer tongue with the hitch ball on the towing vehicle.

A further object of the invention is to provide a hitch in accordance with the preceding objects in which the slide plate is positioned in inclined relation to the base plate and hitch ball with the forward end thereof being bifurcated and curved to engage the opposed curved surfaces of the hitch ball above the center thereof with the rearward end of the base plate and slide plate being interconnected by hook-like connections which enable the rearward end of the slide plate to pivot upwardly to a generally horizontal position thereby enabling the bifurcated forward end of the slide plate to release from the hitch ball and drop downwardly to a generally horizontally disposed position below the hitch ball thereby enabling the ball socket on the trailer tongue to drop downwardly onto and thus become connected to the hitch ball.

Still another object of the invention is to provide a hitch in accordance with the preceding objects with the slide plate including magnets to retain the slide plate in position on the base plate during over-the-road movement and the rearward edges of the housing including tabs associated with side notches in the slide plate to further assist in retaining the slide plate in position on the base plate when not in use.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
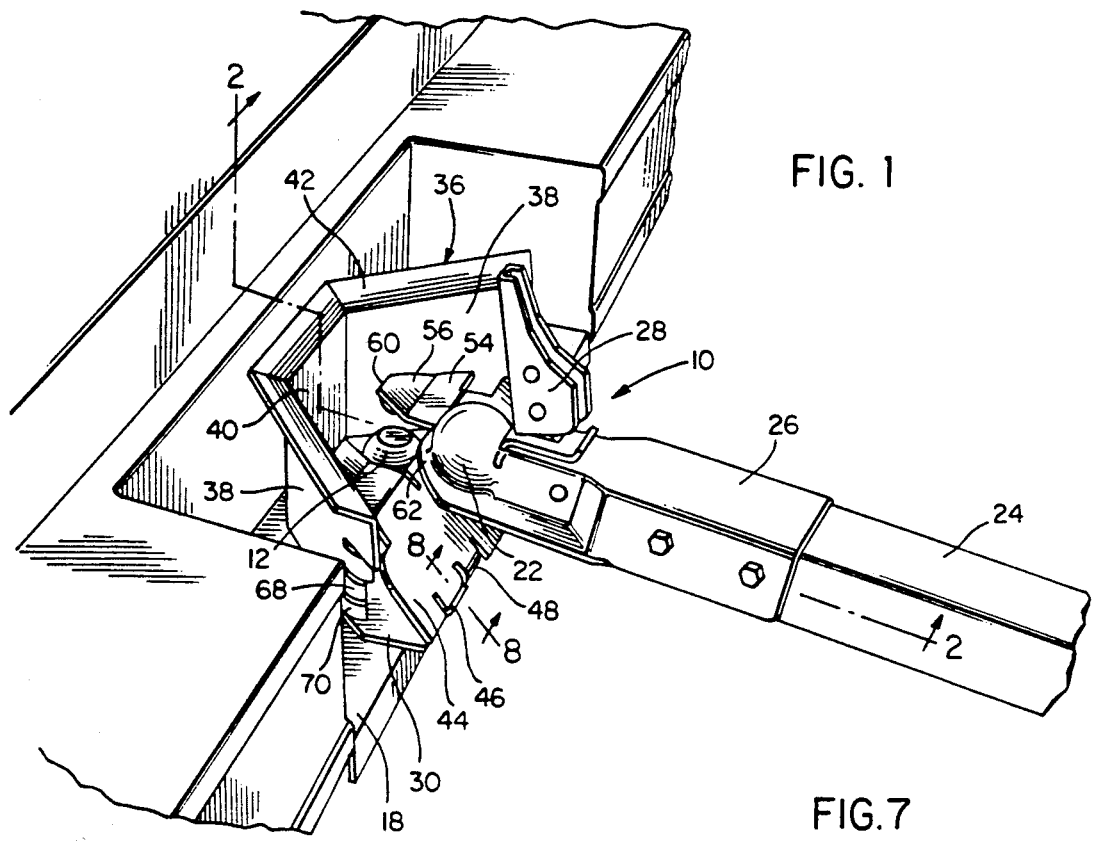
FIG. 1 is a perspective view of the hitch of the present invention.
Figures 5, 6:
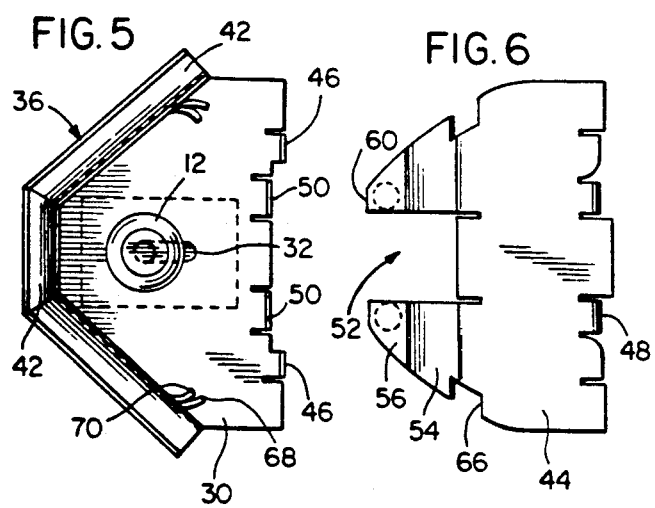
FIG. 5 is a top plan view of the hitch ball, base and housing.
FIG. 6 is a top plan view of the slide plate.
Figure 7:
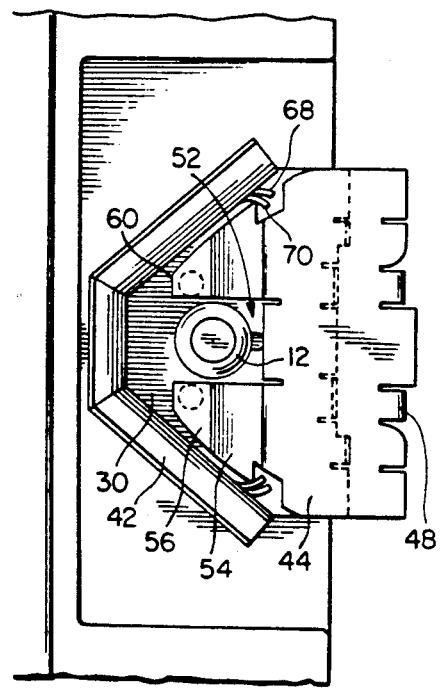
FIG. 7 is a plan view illustrating the orientation of the slide plate in relation to the hitch ball, base plate and housing when the slide plate is disengaged from the hitch ball.

The self-aligning and self-connecting hitch of the present invention is generally designated by reference numeral 10 and includes a conventional hitch ball 12 of spherical configuration having a downwardly extending threaded stem 14 provided with a retaining nut 16 for association with a draw bar or bumper 18 of a towing vehicle with the threaded stem 14 extending downwardly through a longitudinally elongated slot-like opening 20 therein with the nut 16 securely retaining the hitch ball 12 in place. The shape, size and construction of the hitch ball 12 is conventional and no modifications whatsoever have been made in the hitch ball structure. The hitch ball 12 is articulately connected to a hitch ball socket 22 mounted on the forward end of a towed trailer tongue 24 with the hitch ball socket 22 forming part of an attachment bracket 26. A pivotal latching structure 28 is associated with the hitch ball socket 22 in order to lock the hitch ball socket 22 in connecting relation to the hitch ball 12 in a conventional and well known manner. When the towing vehicle is separated from the towed vehicle, difficulties are frequently encountered when the hitch components are to be reconnected. This usually requires that the tongue of the towed vehicle be lifted upwardly in a manual manner or by using some type of lift mechanism while the towed vehicle is maneuvered to align the hitch ball with the socket. Frequently, it is necessary for the operator of the towing vehicle or another individual to manually move the hitch ball socket laterally to align it with the hitch ball and/or lift the tongue and hitch ball socket to position it above the hitch ball in order to connect the hitch between the towing vehicle and towed trailer.

Figure 3:
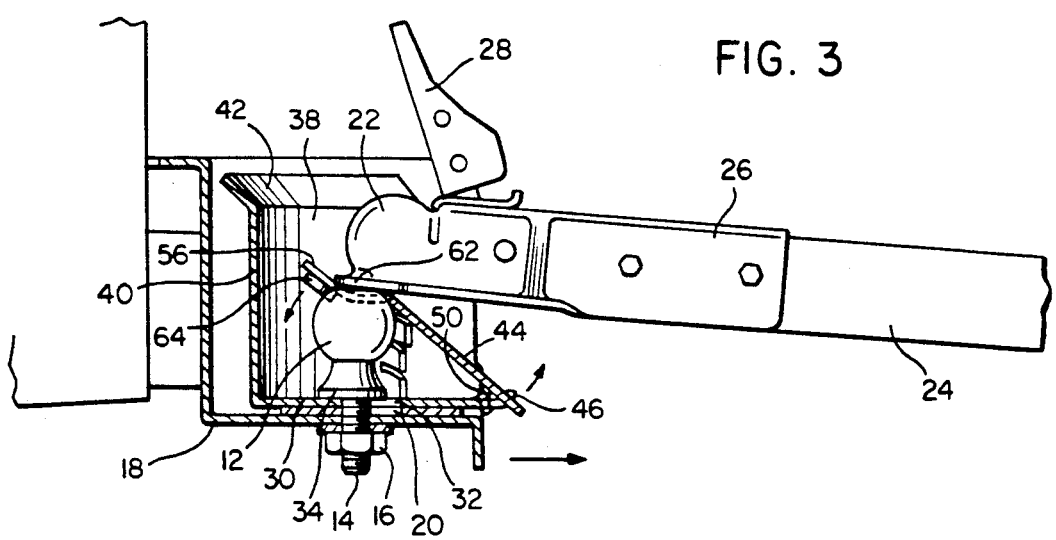

The present invention includes a base plate 30 positioned against the upper surface of the bumper or draw bar 18 and provided with a slot-like opening 32 which receives the threaded stem 14 on the hitch ball thereby anchoring the base plate 30 under the usual provided flange 34 at the upper end of the threaded stem on the hitch ball 12. The base plate 30 includes a housing generally designated by numeral 36 on the forward edges thereof with the housing including a pair of rearwardly diverging side walls 38 which extend from the rearward edge of the base plate 30 to a forward edge thereof with the two sidewalls being interconnected by a relatively short frontwall 40 as illustrated in FIG. 3. The upper edges of the sidewalls 38 and 40 are provided with an outwardly and upwardly inclined flange 42. The structure of the housing allows the hitch ball socket 22 on the trailer tongue 24 to move forwardly with the angulation of the sidewalls 38 guiding the hitch ball socket 22 into alignment with the hitch ball 12 when the socket 22 is above ball 12. The sidewalls 38 also enable the tongue of the trailer to swing laterally in the usual manner during articulate movement of the towing vehicle in relation to the towed trailer when moving in a curved path.

Figure 8:
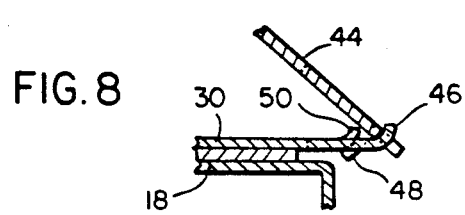
FIG. 8 is a fragmental sectional view, on an enlarged scale, along section line 8—8 on FIG. 1 illustrating the connection between the rearward edge of the base plate and the rearward edge of the slide plate.
Figure 2:
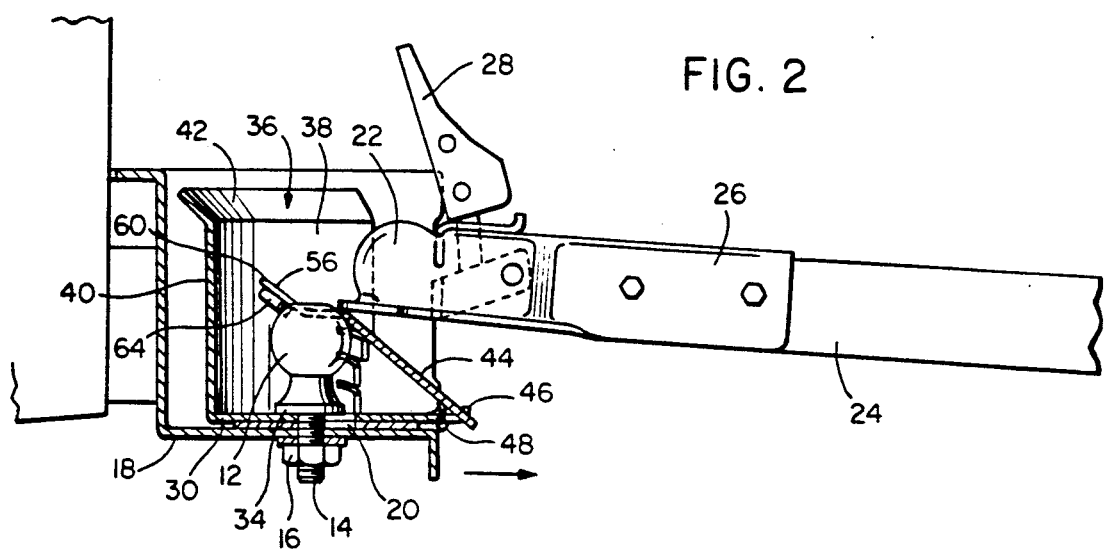
FIGS. 2, 3 and 4 are sectional views of the self-aligning and self-connecting hitch along section line 2—2 on FIG. 1 illustrating the relationship of the components as the hitch ball on the towing vehicle moves rearwardly toward the hitch ball socket on the towed trailer and becomes connected thereto.

The hitch 10 includes a rigid slide plate 44 that generally is the same shape as the rearward portion of the base plate 30. The slide plate 44 is normally oriented in inclined position as shown in FIGS. 1-3 with the rearward edge thereof being detachably connected with the rearward edge of the base plate 30. This connection includes a pair of upturned tabs 46 on the rearward edge of the base plate 30 which are spaced from each other to opposite sides of the hitch ball 12. The tabs 46 curve upwardly for a relatively short length and do not curve forwardly and thus do not form hooks which permits the rearward edge of the slide plate 44 to rest on and be supported by the upper surface of the tabs. The upward and rearward slant of the tabs 46 enables the slide plate to pivot from the generally inclined position of FIGS. 1-3 to a horizontal position by virtue of the rearward edge of the slide plate 44 moving upwardly from its position engaged with the upper surface of the tabs 46. The tabs 46 prevent the bottom edge of the slide plate from moving rearwardly and downwardly in relation to the base plate 30. To prevent the rearward edge of the slide plate 44 from moving forwardly in relation to the rearward edge of the base plate 30, the slide plate 44 has downwardly curved tabs 48 thereon which are spaced from each other and oriented inwardly of the tabs 46 on the base plate 30. The rearward edge of the base plate 30 between the tabs 46 include slightly upturned tabs 50 which engage the forwardly facing surface of the tabs 48 on the slide plate 44 as illustrated in FIG. 8. The tabs 46 are not in the form of reversely curved hooks and provide a forwardly facing surface that is downwardly inclined slightly to the rear as compared to the undersurface of the slide plate thus enabling the rearward edge of the slide plate to swing upwardly but yet preventing the rearward edge of the slide plate from migrating forwardly along the upper surface of the base plate 30. Thus, when the slide plate 44 is positioned in inclined position as illustrated in FIGS. 1-3, engagement of the ball socket 22 with the upper surface thereof will not move the rearward edge of the slide plate 44 forwardly or rearwardly in relation to the base plate in view of the cooperation of the tabs 46, tabs 48 and upturned tabs 50 on the base plate.

Figure 4:
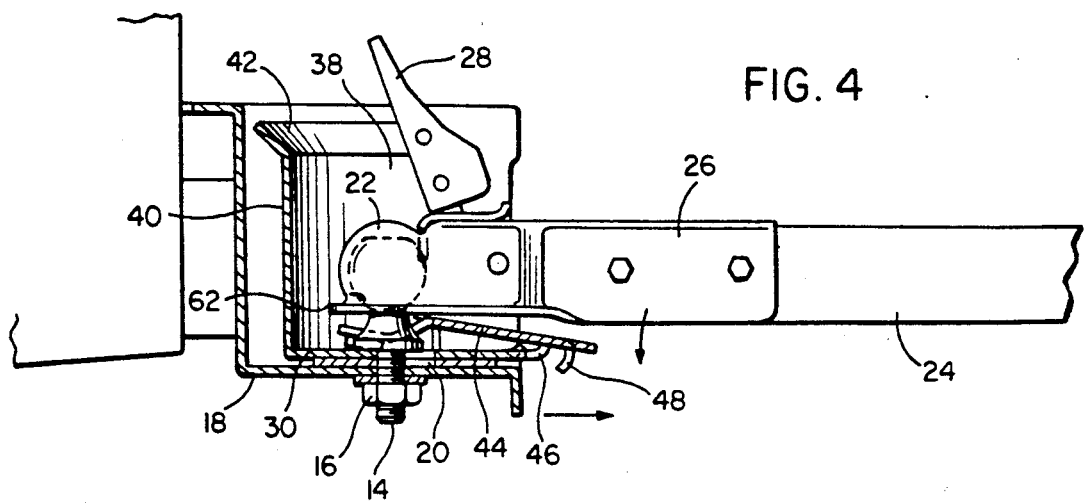

The forward edge portion of the slide plate 44 is provided with a notch 52 having parallel side edges which engage opposite surfaces of the hitch ball 12 when in inclined position as illustrated in FIG. 2. The forward side edge portions of the slide plate 44 are curved inwardly as at 54 which cooperate with the notch 52 to form a pair of forwardly projecting leg portions 56. As illustrated in FIGS. 1-3, the leg portions 56 curve downwardly as at 54 and the free ends of the leg portions then are inclined upwardly at 60. The upwardly inclined end portions 60 of the leg. portions 56 are engaged by the forward edge 62 of the hitch ball socket 22 when it moves into overlying alignment with the hitch ball 60 thus providing a camming action to pivot the slide plate 44 from the inclined position illustrated in FIGS. 1-3 to a generally horizontal position by causing the rearward edge of the slide plate 44 to swing upwardly which is permitted by the particular construction of the tabs 46, 48 and 50. When the slide plate 44 swings upwardly, it then is capable of falling by gravity downwardly to a position against the upper surface of the base plate 30 as illustrated in FIG. 4 thereby permitting the hitch ball socket 22 to move downwardly into connecting engagement with the hitch ball 12 as illustrated in FIG. 4.

The undersurface of the leg portions 56 include magnets 64 which serve to retain the slide plate in position against the upper surface of the base plate 30 thus eliminating the necessity of removing the slide plate and storing it for subsequent use. Also, the slide plate is provided with a pair of laterally opening side notches 66 which cooperate with a pair of rearwardly extending tabs 68 and 70 in the rearward edges of the side walls 38 of the housing. As illustrated, the lowermost of the tabs 70 is bent inwardly to a greater angle than the uppermost of the tabs 68 with the notches 66 enabling the slide plate to move downwardly to a position below the tabs with the longitudinal movement of the slide plate then misaligning the notches with the tabs in order for them to assist in retaining the slide plate in position against the upper surface of the base plate 30.

Thus, in using the present invention, the slide plate 44 is positioned in inclined position as illustrated in FIGS. 1-3 and the towing vehicle is backed toward the ball hitch 22 on the tongue 24 of the towed trailer. The sidewalls 38 of the housing 36 will guide the ball socket 22 into alignment with the hitch ball 12 as the slide plate 44 elevates the ball socket 22 thus not only aligning the socket with the ball but also elevating the socket to a position above and aligned with the ball. As this occurs, the slide plate 44 is pivoted to horizontal position and drops below the ball 12 thus enabling the ball socket 22 to drop onto and thus connect to the ball 12.

The hitch of the present invention works on the principle of an inclined plane that is formed by the slide plate and the slide plate will automatically pivot from its inclined position to a generally horizontal position as the leading edge of the ball socket 22 engages the upwardly curved terminal end surfaces 60 of the leg portions 56. This does not occur until the ball socket 22 rides upwardly on the slide plate and passes over the top of the hitch ball 12. Movement of the slide plate to its horizontal position and disengagement of the rear edge thereof from the rear edge of the base plate enables the slide plate to move in a manner to disengage from the opposed surfaces of the hitch ball and drop downwardly to a position against the base plate 30 as illustrated in FIG. 4 with the magnets retaining the slide plate in place along with the tabs on the housing walls 38. Thus, the present invention does not require removal of or storage of any separate components since the slide plate can remain in place with the magnets and tabs holding the slide plate in stored position against the upper surface of the base plate 30. The weight of the trailer tongue at the ball socket 22 combined with the movement of the slide plate from inclined position to horizontal position and the capability of the slide plate then being movable after disconnection from the base plate all cooperate to move the slide plate downwardly with gravity causing the slide plate to drop downwardly below the ball socket 22 when the socket 22 is engaged with the ball 12. Thus, the hitch ball and socket are automatically aligned and the socket 12 is automatically lifted and aligned with the ball thus providing a self-aligning and self-connecting hitch assembly.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A hitch for connecting a towing vehicle to a towed vehicle comprising a hitch ball mounted on the rear of a towing vehicle and a ball socket mounted on the front portion of a towed vehicle, an inclined plate extending downwardly and rearwardly in an inclined plane from the hitch ball, means supporting the plate in inclined position with the forward edge portion being releasably supported by said hitch ball to form a ramp engaged by the ball socket as the ball socket and ball approach each other to lift the ball socket upwardly to a position overlying the ball with the means supporting the forward edge of the inclined plate from the ball enabling the plate to pivot toward a generally horizontal position and release from the ball to enable the ball socket to automatically drop onto the hitch ball thereby connecting the towed vehicle to the towing vehicle, said towing vehicle including guide means extending vertically above the hitch ball in spaced relation thereto for guiding the ball socket into alignment with the hitch ball when the ball socket is lifted above the hitch ball and moved toward the hitch ball thereby positioning the ball socket in overlying, aligned relation to the hitch ball when the inclined plate is pivoted to horizontal position and released to drop below the hitch all.

2. The hitch as defined in claim 1 wherein said guide means includes a base plate secured in place under the hitch ball, vertically disposed upstanding walls on the forward portion of the base plate with two of the walls extending in rearwardly diverging relation on opposite sides of the hitch ball to guide the ball socket into alignment with the hitch ball.

3. The hitch as defined in claim 2 wherein said inclined plate and said base plate include rearward edges having interengaging means which prevents rearward and forward relative movement of the inclined plate in relation to the base plate and preventing upward swinging movement of the inclined plate toward a horizontal position when the ball socket is lifted to a point above the hitch ball.

4. A hitch for connecting a towing vehicle to a towed vehicle comprising a hitch ball mounted on the rear of a towing vehicle and a ball socket mounted on the front portion of a towed vehicle, an inclined plate extending downwardly and rearwardly in an inclined plane from the hitch ball, means supporting the plate in inclined position with the forward edge portion being releasably supported by said hitch ball to form a ramp engaged by the ball socket as the ball socket and ball approach each other to lift the ball socket upwardly to a position overlying the ball with the means supporting forward edge of the inclined plate from the ball enabling the plate to pivot toward a generally horizontal position and release from the ball to enable the ball socket to automatically drop onto the hitch ball thereby connecting the towed vehicle to the towing vehicle, said towing vehicle including guide means extending vertically above the hitch ball in spaced relation thereto for guiding the ball socket into alignment with the hitch ball when the ball socket is lifted above the hitch ball and moved toward the hitch ball thereby positioning the ball socket in overlying, aligned relation to the hitch ball when the inclined plate is pivoted to horizontal position and released to drop below the hitch ball, said guide means including a base plate secured in placed under the hitch ball, vertically disposed upstanding walls on the forward portion of the base plate with two of the walls extending in rearwardly diverging relation on opposite sides of the hitch ball to guide the ball socket into alignment with the hitch ball, said inclined plate and said base plate including rearward edges having interengaging means which prevents rearward and forward relative movement of the inclined plate in relation to the base plate and permitting upward swinging movement of the inclined plate toward a horizontal position when the ball socket is lifted to a point above the hitch ball, said means interconnecting the rearward edges of the base plate and inclined plate including upwardly inclined tabs on the base plate providing a forwardly facing surface to engage the rearward edge of the inclined plate to prevent rearward movement of the rear edge of the inclined plate in relation to the base plate and downwardly extending inclined tabs on the inclined plate defining forwardly facing surfaces engaging the rear edge of the base plate to prevent forward movement of the rear edge of the inclined plate in relation to the base plate.

5. The hitch as defined in claim 4 wherein said inclined plate includes a bifurcated forward edge defined by a centrally disposed longitudinal notch having side edges engaging opposed surfaces of the hitch ball when in inclined position.

6. The hitch as defined in claim 5 wherein the forward portion of the inclined plate includes curved leg portions with the forward most ends of the leg portions curving upwardly to form cam surfaces engaged by the forward edge of the ball socket when the ball socket moves into overlying aligned relation to the hitch ball to pivot the rearward edge of the inclined plate upwardly to release it from the base plate to enable movement of the inclined plate to disengage the inclined plate from the hitch ball as the inclined plate moves to horizontal position thereby releasing the inclined plate from the hitch ball with gravity causing the inclined plate to drop downwardly onto the base plate.

7. The hitch as defined in claim 6 wherein said inclined plate includes magnetic means on the forward portion thereof to secure the inclined plate on the upper surface of the base plate after the inclined plate has released from the rearward edge of the base plate and the hitch ball for storage of the inclined plate on the upper surface of the base plate.

8. The hitch as defined in claim 7 wherein said inclined plate includes side edge notches, said diverging housing walls including inwardly extending tabs on the rearward edge thereof for registry with the notches as the inclined plate moves downwardly to engage the base plate with the tabs serving as additional means to retain the inclined plate stored against the upper surface of the base plate.

9. A self-aligning and self-connecting ball and socket hitch assembly comprising a hitch ball and a ball socket, rearwardly diverging, upwardly guide means associated with the hitch ball to guide the ball socket into overlying registry with the hitch ball for connection therewith when the socket drops onto the ball with the guide means enabling articulate movement of the hitch ball and socket in angular relation to each other, and an inclined slide plate associated with the hitch ball forming a rearwardly facing inclined ramp engaged by the ball socket as the socket moves towards the hitch ball to elevate the ball socket into overlying relation to the hitch ball with the guide means aligning the socket with the hitch ball, said inclined slide plate being movable to a generally horizontal position by the ball socket when the socket moves up the ramp into overlying, aligned relation to the ball, and means on the plate engaging the ball and being released from the ball in response to engagement by the socket to drop downwardly below the ball to enable the ball socket to drop by gravity on the hitch ball thereby providing a self-aligning and self-connecting hitch.

10. The ball and socket hitch assembly as defined in claim 9 wherein said guide means includes a bottom plate extending rearwardly of the ball, the rearward edge of said bottom plate and the rearward edge of said inclined slide plate including means preventing forward and rearward movement of the rearward edge of the inclined slide plate when the inclined slide plate is oriented in inclined position with the interengaging means being released when the rearward edge of the inclined slide plate is pivoted upwardly toward a horizontal position, the forward edge of said inclined slide plate including a longitudinally extending notch having side edges engaged with diametrically opposed surfaces on the hitch ball to support the inclined slide plate in inclined position as the ball socket moves upwardly along the upper surface of the inclined slide plate as the hitch socket and the hitch ball move toward each other, the forward edge portion of said inclined slide plate also including cam surfaces engaged by the ball socket to pivot the inclined slide plate from its inclined position to a generally horizontal position as the ball socket becomes aligned with and in overlying registry with the hitch ball with the pivotal movement of the inclined plate enabling the inclined plate to be released from the ball and dropped downwardly to a position below the hitch ball thereby enabling the ball socket to drop by gravity onto the hitch ball.

* * * * *